United States Patent [19]
Spier

[11] 3,777,605
[45] Dec. 11, 1973

[54] VEE-NOTCHING DEVICE

[75] Inventor: Raymond A. Spier, Huntsville, Ala.

[73] Assignee: The United States of America as represented by the Secretary of the National Aeronautics and Space Administration, Washington, D.C.

[22] Filed: Sept. 23, 1971

[21] Appl. No.: 182,977

[52] U.S. Cl.................. 83/452, 83/602, 83/917, 269/48.1
[51] Int. Cl............................................. B26d 7/02
[58] Field of Search................ 83/602, 452, 464, 83/605, 917; 269/48.1; 408/79; 85/73, 75

[56] References Cited
UNITED STATES PATENTS

| | | | |
|---|---|---|---|
| 2,815,811 | 12/1957 | Feiertag | 83/917 X |
| 2,870,837 | 1/1959 | Rosenberg | 83/602 X |
| 1,035,277 | 8/1912 | Veres | 85/75 |
| 3,203,289 | 8/1965 | Beekley | 83/917 X |
| 3,616,719 | 11/1971 | Tassie | 83/917 X |
| 2,812,816 | 11/1957 | Hoffman | 83/917 X |

Primary Examiner—Andrew R. Juhasz
Assistant Examiner—Leon Gilden
Attorney—L. D. Wofford, Jr. et al.

[57] ABSTRACT

A device for forming Vee-notches in tensile test specimens comprising a vertically reciprocating, triangular, triple-edged cutting tool guided in a corresponding triangular slot. The specimen to be vee-notched is mounted on a carriage that is movable toward and away from the cutting tool. The specimen is precisely positioned on the carriage by tapered studs that extend into holes in the specimen and are used to expand spring collets against the wall of the holes.

6 Claims, 4 Drawing Figures

RAYMOND A. SPIER
INVENTOR.

BY Wayland H. Riggins
ATTORNEY

RAYMOND A. SPIER,
INVENTOR

BY Wayland H. Riggins
ATTORNEY 3,777,605

VEE-NOTCHING DEVICE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to cutting tools and more particularly to a device for cutting Vee-notches in tensile test specimens.

One well known technique for tensile testing of metallic specimens involves forming a Vee-notch around or on opposite edges of the specimen to be tested prior to subjecting the specimen to tension. The value and reliability of tensile testing in this manner depends in part on accuracy and precision in the positioning and uniformity of the Vee-notches in the test specimen. For example, when Vee-notches are formed in the opposite edges of a test specimen it is imperative to the test validity that there be no misalignment of the notches from one edge to the other. To achieve the degree of precision required, the tool employed in forming the Vee-notches in test specimens must provide very accurate means for mounting the test specimen. The tool must also provide very firm guiding means for the cutting tool and the specimen support so as to avoid unwanted and intolerable deflection of these elements during notching operations.

Prior art devices for making Vee-notches in test specimens are regarded as unduly large, complex and expensive for many purposes. Moreover, the capability of making Vee-notches with the desired precision and uniformity is deemed lacking in some prior devices.

SUMMARY OF THE INVENTION

The invention comprises a vertically oscillating cutting tool supported and guided in a slot conforming to the shape of the cutting tool. A carriage for supporting the test specimen is finely adjustable in directions toward and away from the cutting tool. The test specimen has holes therein that respectively receive tapered studs projecting from the carriage. Spring collets are positioned over the studs within the holes in the specimen and are expanded by the tapered studs against the walls of the holes to precisely position and firmly secure the specimen for forming a Vee-notch.

Accordingly, it is an object of the present invention to provide a device for forming Vee-notches in test specimens which affords great precision and accuracy in the positioning and in the uniformity of the Vee-notches.

Another object of the invention is to provide a relatively compact, simple and economical device for providing Vee-notches in metallic test specimens prior to tensile test of the specimens.

A more specific object of the invention is to provide a Vee-notching tool having means for precisely positioning a test specimen thereon in a quick and convenient manner.

A further object of the invention is to provide a Vee-notching tool permitting increased use of the cutting element prior to sharpening thereof.

These and other objects and advantages of the invention will become apparent upon reference to the follwoing specification, attendant claims and drawing.

DESCRIPTION OF THE PREFERRED EMBODIMENT

Figure 2:
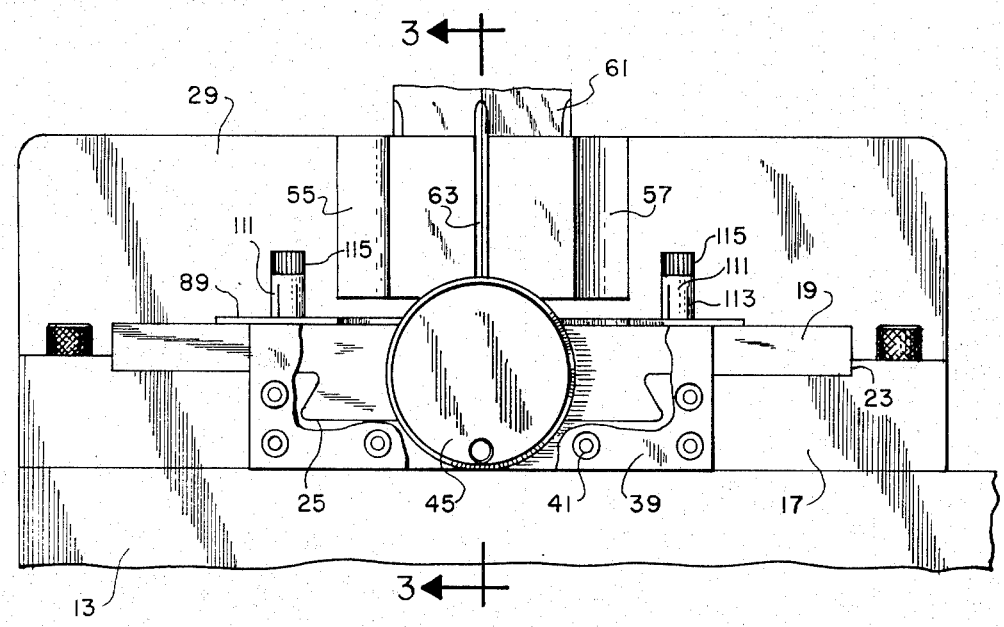
FIG. 2 is a front elevational view, partially broken away, of the device of FIG. 1.
Figures 1, 4:
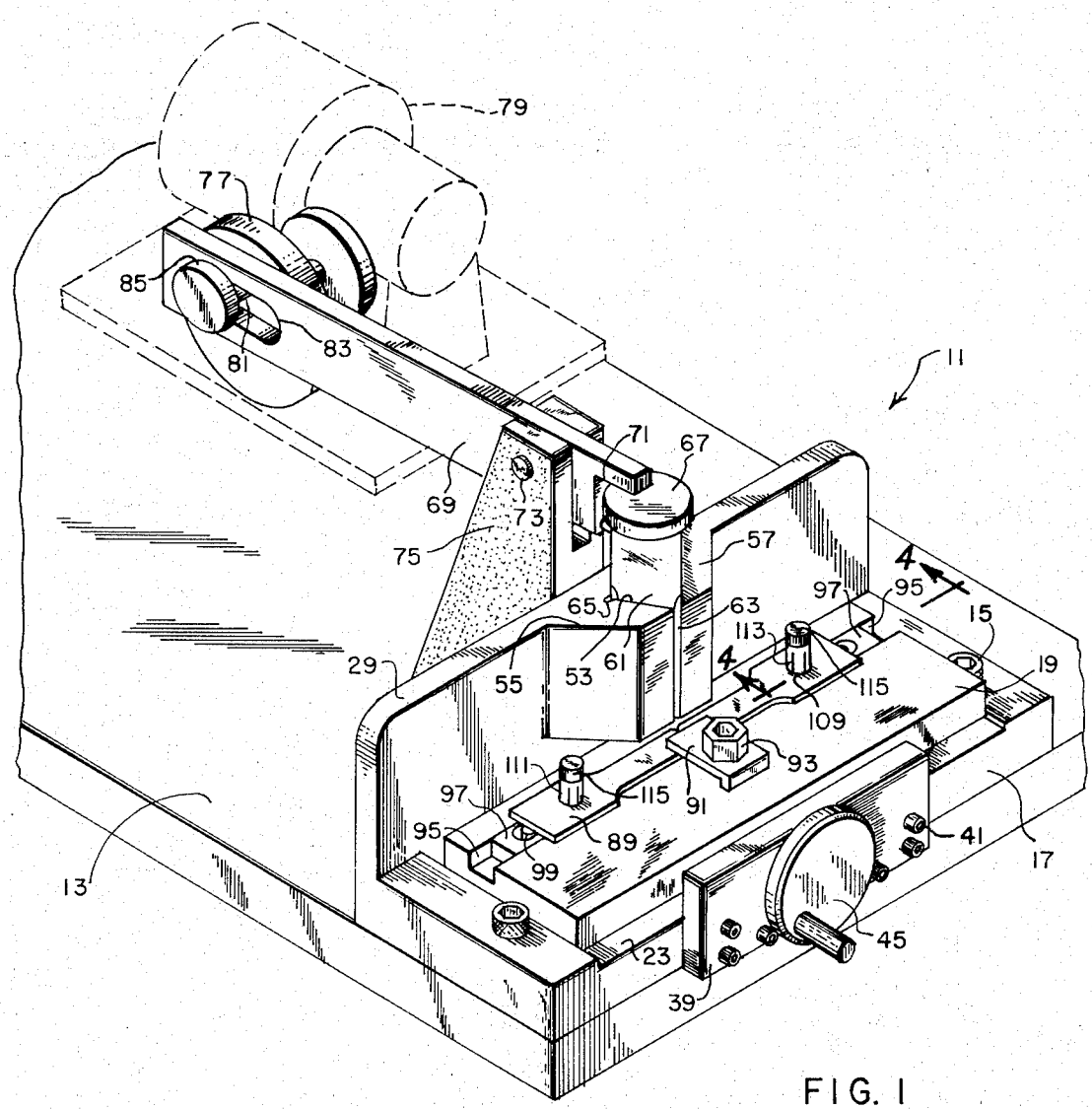
FIG. 1 is a pictorial view of a Vee-notching device embodying the present invention.
FIG. 4 is a sectional view taken along line 4—4 of FIG. 1.

Referring to FIG. 1 there is shown a Vee-notching device, indicated generally at 11, secured to a supporting member 13 by screws 15 extending through a base plate 17. A carriage 19 fits in a recess 23 in the base plate 17 and also mates with the base plate 17 through a dovetail interlock 25 (FIG. 2) that provides firm guiding of the carriage as it moves adjustably toward and away from a vertical plate 29 that may be integral with the base plate 17.

Figure 3:
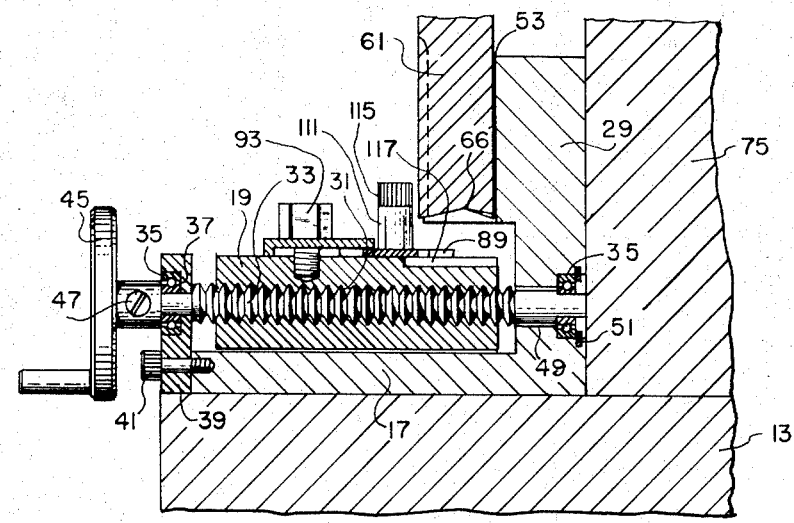
FIG. 3 is a sectional view taken along line 3—3 of FIG. 2.

As shown in FIG. 3, a threaded hole 31 extends through the center of the carriage 19 and receives a crank screw 33 that is supported at one end by a bearing assembly 35 mounted in a hole 37 in a front crank support plate 39. Screws 41 secure the plate 39 to the base plate 17. The front end of the crank screw 33 fits in a socket of carriage adjustment crank wheel 45, being clamped thereto by a screw 47. The opposite end of the crank screw 33 extends into a hole 49 in the vertical plate 29 and is rotatably supported by a bearing assembly 35 retained by retaining rings 51. Thus the carriage 19 is movable with fine adjustment longitudinally of the crank screw 33 by rotation of the crank wheel 45.

The vertical plate 29 has a triangular, vertically extending slot 53 formed in the center thereof by integral angular projections 55 and 57. The slot 53 guides and supports a triangular cutting tool 61 that fits firmly in the slot 53 while oscillating vertically as will be explained subsequently.

One cutting edge of the cutting tool 61 projects slightly through an opening 63 in the front of the slot 53 between the angular projections 55 and 57. The remaining corners of the slot 53 are rounded, as at 65, receiving two other cutting edges of the cutting tool 61. The lower end of the cutting tool 61 is hollow ground as indicated at 66 in FIG. 3 giving taper to all three cutting edges all of which may be used prior to sharpening the tool simply by repositioning the tool in the slot 53.

The top portion of the cutting tool projects above the slot 53 and a disk 67 (FIG. 1) is welded on the upper end thereof. A rocker arm 69 at one end engages the disk 67 through a slot 71 that receives the disk. The vertical dimension of the slot 71 may be made adjustable to the desirable size by employing an angle-shaped element (not shown) having one leg engaging the underside of the disk 67 and the other leg clamped to the end of the rocker arm 69 with a screw in a slotted hole for vertical adjustment. The rocker arm 69 is pivotally supported by a pivot pin 73 passing through a bracket 75 secured to the supporting surface 13.

The end of the rocker arm opposite the cutting tool 61 is linked with a wheel 77 rotated by an electric motor 79. This wheel 77 has a short eccentrically positioned shaft 81 projecting through a slot 83 in the rocker arm 69. A retaining ring 85 is releasably secured to the shaft 81. It is apparent that rotation of the wheel 77 by the motor 79 produces rapid pivoting motion of the rocker arm 69 about the pin 73 causing rapid vertical oscillation of the cutting tool 61.

The means for precisely mounting a test specimen on the carriage 19 will be described primarily with reference to FIGS. 1 and 4. In FIG. 1 a test specimen 89 is shown mounted on the carriage 19. A clamp 91 held by a screw 93 bears on the center of the test specimen. However, the exactness in positioning the test specimen is assured by further means which will now be described.

A pair of slots 95 are formed in the carriage 19 and slidably disposed within each of these slots 95 is a sliding block 97 (FIGS. 1 and 4). The blocks 97 are adjustably clamped in the desired position by screws 99 threaded into the carriage 19 through slots 101. Each of the sliding blocks 97 also has a tapered hole 105 therein in which an internally threaded tapered stud 107 is pressure fitted. The studs 107 project above the surface of the carriage 19 and through holes 109 (FIG. 4) in the specimen 89. When the specimen 89 is positioned above the sliding blocks 97 with the tapered studs extending through the matching holes 109 in the specimen, the specimen is exactly positioned by placing a spring collet 111 having slots 113 therein around each of the studs 107 and threading a screw 115 in the tapered studs. The screws 115 in each stud are then tightened which forces the collets to expand while moving downwardly over the tapered studs. The expanding collet around each stud causes the holes 109 in the specimen 89 to be concentrically aligned with the respective studs 107. The collets 111 secure the specimen 89 by expanding against the walls of the holes 109.

Owing to the described means for mounting the test specimen, the specimens can be repeatedly mounted on the carriage with exact positioning in relation to the cutting tool. Since the holes 109 in the specimen are always centered by the collets 111 with respect to the studs 107, variations in the positioning of the specimen due to possible variations of tolerances in the sizes of the holes 109 are avoided.

As shown in FIG. 3, a clearance recess 117 for the cutting tool 61 is provided in the carriage 19 beneath the specimen 89 in a vertical alignment with the cutting edge of the cutting tool.

As is apparent from the foregoing description, in operation of the device the test specimen 89 is mounted on the carriage 19 in the manner heretofore explained. The specimen is moved into the path of the oscillating cutting tool 61 by rotating the carriage adjustment wheel 45 that provides for fine movement of the carriage. The cutting tool and the carriage are firmly supported and guided and are not subject to undesirable deflections that would cause errors in the positioning and uniformity of the Vee-notches.

I claim:

1. A device for forming notches in a specimen comprising:
    a cutting tool having a plurality of cutting edges and being guided and supported for oscillation longitudinally of said tool in a slot having a cross-sectional configuration corresponding to the cross-sectional configuration of said cutting tool;
    means interconnected with said cutting tool for producing oscillatory motion of said tool;
    a carriage for supporting a specimen to be notched;
    means for adjustably moving said carriage in directions either toward or away from said cutting tool;
    means for precisely mounting said specimen on said carriage;
    said means for mounting said specimen on said carriage comprising a plurality of movably mounted tapered studs projecting above the surface of said carriage and being adapted to extend through preformed holes in said specimen;
    an expandable element comprising a cylindrical spring collet for fitting over each of said tapered studs and being expanded by said tapered studs against the walls of said preformed holes in said specimen for firmly securing said specimen and concentrically aligning said holes and said studs;
    one of said cutting edges of said cutting tool being adapted to intersect said specimen when mounted on said carriage upon movement of said carriage toward said cutting tool.

2. The invention as defined in claim 1 wherein said cutting tool and said slot are of triangular cross section, said tool comprising a cutting edge at each corner of said triangle.

3. The invention as defined in claim 2 wherein said slot has a longitudinal opening therein, said one of said cutting edges projecting through said opening for intersecting said specimen.

4. The invention as defined in claim 1 wherein said carriage comprises a pair of opposed rectangular slots therein, said means for mounting said specimen on said carriage further comprising a sliding block in each of said rectangular slots, each of said blocks carrying one of said tapered studs, means for adjustably clamping said blocks within said slots.

5. The invention as defined in claim 4 wherein each of said studs are threaded internally, a headed screw adapted to be threaded into each of said studs, said head of each of said screws adapted for bearing on one of said expandable elements and forcing said expandable element to move axially of said element.

6. The invention as defined in claim 1 wherein said device comprises a plate disposed in a plane perpendicular to the plane of said carriage, said slot being formed in part by a pair of projections joined to and extending angularly from said plate toward said carriage.

* * * * *